(12) United States Patent
Hallock

(10) Patent No.: US 10,037,419 B2
(45) Date of Patent: Jul. 31, 2018

(54) SYSTEM, METHOD, AND APPARATUS FOR PERSONAL IDENTIFICATION

(71) Applicant: Richard James Hallock, Naples, FL (US)

(72) Inventor: Richard James Hallock, Naples, FL (US)

( * ) Notice: Subject to any disclaimer, the term of this patent is extended or adjusted under 35 U.S.C. 154(b) by 0 days.

(21) Appl. No.: 15/430,637

(22) Filed: Feb. 13, 2017

(65) Prior Publication Data

US 2018/0012005 A1 Jan. 11, 2018

Related U.S. Application Data

(60) Provisional application No. 62/360,616, filed on Jul. 11, 2016.

(51) Int. Cl.
*G06F 21/32* (2013.01)
*H04L 29/06* (2006.01)
*G06N 3/04* (2006.01)
*H04W 12/06* (2009.01)

(52) U.S. Cl.
CPC ............ *G06F 21/32* (2013.01); *G06N 3/04* (2013.01); *H04L 63/0861* (2013.01); *H04W 12/06* (2013.01); *H04L 2463/082* (2013.01)

(58) Field of Classification Search
CPC .......... H04L 63/0861; H04L 2463/082; G06F 21/31; G06F 21/32; H04W 12/06; G06N 3/04
See application file for complete search history.

(56) References Cited

U.S. PATENT DOCUMENTS

| 4,532,508 | A | 7/1985 | Ruell |
| 5,442,342 | A | 8/1995 | Kung |
| 6,657,614 | B1 | 12/2003 | Ito |
| 7,689,013 | B2 | 3/2010 | Shinzaki |
| 8,046,836 | B2 | 10/2011 | Isokawa |

(Continued)

OTHER PUBLICATIONS

Kent German. "Why you want a dual-SIM phone" article published Feb. 28, 2013 (4 pages) https://www.cnet.com/news/why-you-want-a-dual-sim-phone/.*

(Continued)

*Primary Examiner* — Joseph P Hirl
*Assistant Examiner* — Thomas Gyorfi
(74) *Attorney, Agent, or Firm* — Larson & Larson, P.A.; Frank Liebenow

(57) ABSTRACT

A method and system determines a probability that a mobile device is in use by a first user. Sensors of a mobile device are used to detect and quantify human activity and habitual or behavior traits. A collection of such habitual human trait values identifying a first user of the device are memorized during a training and learning period. During subsequent periodic predictive periods, a new collection of like habitual trait values of the current user of the device, when captured and compared with memorized values of the first user of the device relative to time, uniquely identify the person in possession of the mobile device as being or not being the first user of the device. By associating this knowledge with a unique device known to be assigned to the first user of the device, it becomes possible to confirm identity without risk of impersonation.

24 Claims, 9 Drawing Sheets

(56) References Cited

U.S. PATENT DOCUMENTS

| | | | |
|---|---|---|---|
| 8,176,159 B2 | 5/2012 | Kashi |
| 8,179,563 B2 | 5/2012 | King |
| 8,270,726 B2 | 9/2012 | Niinuma |
| 8,302,176 B2 | 10/2012 | Huang |
| 8,364,120 B2 | 1/2013 | Kuhlman |
| 8,558,662 B2 | 10/2013 | Nakajima |
| 8,634,808 B1 | 1/2014 | Zhong |
| 8,638,363 B2 | 1/2014 | King |
| 8,863,307 B2 | 10/2014 | Sorek |
| 8,887,187 B2 | 11/2014 | Ohmae |
| 9,141,779 B2 | 9/2015 | Shen |
| 9,160,546 B2 | 10/2015 | Sorek |
| 9,282,086 B2 | 3/2016 | Klein |
| 9,311,464 B2 | 4/2016 | Stuntebeck |
| 9,330,256 B2 | 5/2016 | Gupta |
| 9,400,879 B2 | 7/2016 | Tredoux |
| 2002/0066038 A1 | 5/2002 | Mattsson |
| 2005/0097364 A1 | 5/2005 | Edeki |
| 2007/0118758 A1 | 5/2007 | Takahashi |
| 2007/0245155 A1 | 10/2007 | Mimura |
| 2007/0253604 A1 | 11/2007 | Inoue |
| 2008/0059807 A1* | 3/2008 | Miller, Jr. .......... G06K 9/00885 713/186 |
| 2009/0049544 A1 | 2/2009 | Kashi |
| 2009/0148006 A1 | 6/2009 | Hayasaki |
| 2009/0264155 A1 | 10/2009 | Nakaymama |
| 2009/0320123 A1 | 12/2009 | Yu |
| 2010/0188328 A1 | 7/2010 | Dodge |
| 2012/0124662 A1 | 5/2012 | Baca |
| 2012/0198532 A1 | 8/2012 | Headley |
| 2012/0206330 A1 | 8/2012 | Cao |
| 2013/0063581 A1 | 3/2013 | Komatsu |
| 2013/0290229 A1 | 10/2013 | Tsukamoto |
| 2013/0291097 A1 | 10/2013 | Tsukamoto |
| 2013/0326600 A1 | 12/2013 | Sorek |
| 2014/0310803 A1 | 10/2014 | Irie |
| 2014/0317744 A1 | 10/2014 | Turgeman |
| 2015/0058961 A1 | 2/2015 | Sorek |
| 2016/0085407 A1 | 3/2016 | Liu |
| 2016/0098705 A1 | 4/2016 | Kurapati |
| 2016/0180068 A1* | 6/2016 | Das .......... G06F 21/32 726/7 |
| 2016/0234023 A1* | 8/2016 | Mozer .......... H04L 9/3231 |
| 2016/0285866 A1* | 9/2016 | Allen .......... H04L 63/0861 |
| 2016/0296142 A1 | 10/2016 | Culbert |
| 2017/0091595 A1* | 3/2017 | Wang .......... G06K 9/66 |

OTHER PUBLICATIONS

"Subscriber Identity Module" article from Wikipedia dated Feb. 11, 2016 (15 pages) https://en.wikipedia.org/w/index.php?title=Subscriber_identity_module&oldid=704396028.*

* cited by examiner

SYSTEM, METHOD, AND APPARATUS FOR PERSONAL IDENTIFICATION

CROSS-REFERENCE TO RELATED APPLICATION

This application claims priority to provisional patent application No. 63/360,616 filed on Jul. 11, 2016, which is currently pending. The provisional patent application identified is incorporated herein by reference in its entirety to provide continuity of disclosure.

FIELD

This invention relates to the fields of security, identification and access management and more particularly to a system or method for determining that a person, hereinafter the First User, is who they claim to be based on querying a device in their possession.

BACKGROUND

Computer security has become a paramount issue. Take for example the recent hacking into many email systems. Today, many systems are protected with encryption keys, passwords, rolling security keys, biometric detection, etc., yet hackers are still able to find openings in existing "secure" systems. It has long been accepted that a single device on a network becomes the weakest link and improper protection of that single device often makes the entire network vulnerable.

A single device becomes vulnerable through poorly crafted passwords (e.g. "password!" or "password1"), through poor account management (e.g., having an account on the device that is not password protected), by opening the wrong email, by browsing to a web site that has trap doors, etc. This single device also becomes vulnerable through lack of physical security such as forgetting the device in the seat-back pocket on a flight.

Unfortunately, security places a burden on the user of the device, having to remember passwords to access the device, using a biometric scanner each time the device is used, storing and managing keys, etc. The greater this burden, the more likely the user will find shortcuts, use simpler passwords, write down passwords, change time-outs to keep the device open longer, etc. Each shortcut severely weakens the security of the device.

Physical access security, like computer security, is likewise a concern and has been since the dawn of mankind. Visiting a major public event, arriving at the airport to board a plane or, in most cases, the simple act of entering one's place of employment demonstrate clearly the ever-increasing attention to physical security.

Personal identity security, like computer and access security, has come into intense and increasing focus due to the rapid increase in occurrences of identity theft. In 2005 very few had ever heard of income tax return identity theft and in 2015 such identity theft was a concern of many American tax payers and the Internal Revenue Service. So pervasive is the identity theft scourge that by 2016 monitoring and providing identity theft warning services became a multi-billion dollar business model, a service that notifies one of occurrence of, not protection from, identity theft.

Throughout modern history there has been and remains the need to establish the identity of a person, especially related to the use and access of a device and/or system but also as it relates to physical access security and personal identity security. There is an urgent need for the ability to establish that a person is who they claim to be. Throughout that same history, there have appeared actors who would usurp the identity of others for their own personal benefit. Such activity is often referred to as "identity theft" or "impersonation" or other euphemisms which collectively mean that one person has taken on the identity of another person more often than not for ill-gotten gains or to perform some nefarious act that may include physical harm to individuals and/or property or of complete societies, doing so while hiding behind the identity of an innocent individual.

Existing personal identifiers come in many different forms, shapes and sizes. In the physical space examples include driver's licenses, social security numbers, identification cards, birth certificates, passports and so on. In cyber space, there are user names and passwords, secret phrases, one time use integers, PINs, biometrics and more packaged as one, two or three factor authentication schemes.

Application of these various forms of personal identifiers are also many and varied but typically follow along the lines of: a person seeks access to a protected resource; the outer layer of security delivers a challenge to the person seeking access; personal identifier credentials of some nature are presented in response to the challenge; presented credentials are evaluated on two levels: are they valid and are they suitable to allow the access being sought; and upon verification the personal identifier is acceptable, the presenting person is granted access. This scenario plays out when the personal identifier is a physical thing such as for example: when a driver's license or passport is presented before boarding a plane. A similar scenario plays out in the cyber world when a user name and password are required to access online accounts or a PIN is required to enter one's place of employment. It is nearly impossible to make it through a day without being challenged to prove one's identity by presentation of some form of personal identifier.

There are failings of prior mechanisms that allow actors to usurp the personal identifier of a victim and to use that personal identifier to undertake an "impersonation attack."

One failing of all prior mechanisms is the statically stored credential: the password, the single use token, the secret phrase, the biometric image or the driver's license, passport or birth certificate. If an object is stored as a static thing then it implicitly becomes available for discovery, hijacking, forgery and theft.

Additionally, the main failing of all current systems is a reliance on authentication of the credentials presented, not the person presenting them. Anyone presenting the good credentials of another person will be authenticated and granted access.

What is needed is an ability for a person to produce evidence derived in real-time establishing they are who they claim to be; a device that is uniquely identifiable on a worldwide basis, impossible to duplicate, known to belong to the person and having the ability to affirm from real-time calculations that the person in possession of the device is the person the device is assigned to and thus the presenter is therefore the person they claim to be.

SUMMARY

Everyone has habits, preferences, abilities and mobility traits. One person is left handed and another is right handed. One person has blue eyes, another brown and yet another has hazel eyes. One person is female, the other male. One person holds a cell phone vertical at eye level; another person holds a cell phone at chest height at a 45-degree angle. One person uses two fingers to type on a touch screen, another types with a single finger. One person types at a very slow speed, another types very fast. One person drives to work each day using the same set of turns. One person is always at home by 9:00 PM. All of these traits, habits, preferences, behaviors, etc., are recognizable and when considered collectively, can be used to uniquely identify the person who manifests the given set of known traits. A device configured to capture, learn and monitor such traits resulting from device usage by a first user in possession of the device acquires the wisdom to know when the user in possession is that first user. If that device is uniquely addressable on a worldwide basis and if that device can report this wisdom, then that device becomes the perfect personal identifier.

In such, an application running on a mobile device, such as a cell phone, performs logic as a surrogate of the personal identifier of the person to whom that device is assigned or belongs. The application uses sensors and inputs of the device to learn physical, physiological, biometric, environmental or activity traits of a first user of the device. Such learned knowledge is further refined over time to become more accurate and to accommodate lifestyle changes. Subsequent to learning the traits of a first user, those same sensors are employed to monitor usage of the device and to calculate proper possession in real-time in such a way as to affirm or deny that the user in possession of the device is the first user to which the device belongs with a very high degree of accuracy.

The application of the personal identifier device is a real-time process performed on the instant, periodically, or continuously; without requiring users to remember credentials, providing proof that is inextricably linked to a specific device that is unique on a worldwide basis and known to belong to or be assigned to the first user of the device. An imposter will find it virtually impossible to usurp the personal identifier and therefore ultimately impossible to impersonate the first user to gain access where access should be denied.

By knowing in advance who a device belongs or is assigned to and by querying that device at any given point in time, an inquisitor can learn with certainty if the device is in the possession of the user associated with the device. As such, inquisitors have a level of assurance that the person is who that person claims to be; simply put, the person is authenticated, not their personal identification credentials.

The present invention relies on the natural inclination of humans to be creatures of habit and on the ability of the personal identifier device to detect, sense and capture measurable values representing human habitual traits by use of sensor circuits contained within the device or sensor circuits that are contained within external devices that are accessed by use of transceiver circuits of the personal identifier device such as Bluetooth networks, near-me area networks or body area networks or other like RF network transceivers. There are many different types of sensors that may be employed, including time and day, accelerometer, ambient temperature, gyroscope, heart rate, blood pressure, glycosometer, oximeter, DNA, weight scale, ambient light, IR (infrared light), magnetometer, atmospheric pressure, proximity, relative humidity, device temperature, touch screen, camera front, camera back, microphone, cell tower, GNSS (GPS, GLONASS, Galileo), UV (ultraviolet light), GFR (galvanic skin response), human temperature, respiration, hydration, and motion (3dof, 6dof) and others, all of which are candidates for deriving a measurable value pertaining to one or more human traits. It's important to note that seldom is it the case that a single sensory input can be used to produce a measurable value of a human trait. In most cases, there is the need to capture inputs from two or more sensors using those captured sensory values to develop a single human trait measurable value sample falling generally in the class of physical, physiological, environmental, biometric, emotional, or activity. Thus, the present invention relies on there being a plurality of sensory inputs representing a subset of those listed here.

While humans are creatures of habit, reliance on a single habitual human trait to identify a specific person among all other persons on earth is ill-advised if not outright assured of producing a false-positive result, not to mention the ease with which a single sensory source can be defeated. However, by evaluating a set of multiple human traits relating to physical, physiological, environmental, biometric, or activity, each of which relies on multiple sensory inputs, it is possible to identify a specific person out of all others on earth without risk of duplication or false positive results. Hence, the present invention relies on the use of a plurality of measurable values representing human traits using a subset taken from a large collection of different human traits derived by use of generally available sensor technology. A chosen subset of human traits is used to establish an awareness and identity of the first user of the device and subsequently, the potential equality relationship of a present user of the device to the first user of the device. In doing so the personal identifier device arrives at a conclusion that the present user in possession is or is not the first user.

For example, the location human trait is a strong contributor to establishing the identity of most humans. By use of the time sensor and the GNSS (GPS, GLONASS, Galileo) sensor it is possible to periodically establish the location of the device and hence the location of the user in possession of the device. In some instances, other sensors such as WiFi network and cell tower identifiers can be used to augment or establish a coarse location.

In another example, the handedness of the present user of the device can be established by use of a collection of sensors including touch screen, time, accelerometer and gyroscope. While the user handedness contributes little to establishing a positive conclusion of the present user as being the first user, in the alternative, if a left handed present user is in possession of a device belonging to a right handed first user then the handedness trait individually establishes the present user is not the first user.

In yet another example, the determination of human traits such as gender, eye size, eye color, eye spacing, hair, hair color, skin color, emotion and facial hair can all be established by use of a set of sensors including touch screen interface 92, accelerometer 8, gyroscope 11, time, and camera 93 (front facing and/or back facing). Upon determination, the present user is interacting with the device; one or more images are captured from the front facing camera and analyzed to establish measurable values for each of these human traits that collectively provide a very reliable determination of identity of the present user of the device.

By combining these example human traits in a personal identifier device, proof of identity is assured in a way that is, from a practical point of view, impossible to defeat.

Embodiments of the present invention incorporate a one-time training and learning process by which the human traits of the first user are captured, learned and memorized to a first user knowledgebase. Learning as used here is the process of producing from sensory inputs a dataset that represents the trait of a first user and that can be employed as input to a comparator circuit to establish if captured traits of a present user of the device equal those of the first user.

Learning is best suited to a mathematical process such as, for example RNN or FFNN Neural Networks. The results of learning are datasets representing the captured human trait at a given instant in time. The datasets are recorded to the first user knowledgebase in such a way as to create a timeline of dataset events. Training and learning is carried out over a period of sufficient length to facilitate confirmation of user in possession, often a full week or more but not germane to the invention process but rather to the application and embodiment of the process.

Embodiments of the present invention incorporate a process responsible for predicting the probability a human trait event of the present user of the personal identifier device is indicative of a like human trait event of the first user of the device on a time aligned basis; the first level predictive process. There is a human trait predictive process for each human trait employed in an embodiment. The first level predictive process is periodic in nature occurring at predetermined schedule times or as a result of receipt of sensor event notification. Determination the human trait event of the present user in possession is that of the first user is arrived at by capturing the measurable value indicative of the human trait and comparing that value to the like human trait measurable value retrieved from the first user knowledgebase relative to the time of the periodic event. The comparator employed can be of any type suitable to the task of establishing equality, such as for example a neural network used to establish a probability of equality. The comparator results establish the human trait of the present user is either that of the first user or not that of the first user or a user whose identity cannot be absolutely determined. In the event of unknown user determination, the present user is prompted to provide proof of identity that when verified result in modification to the comparator output probability to either of the other two possible states. Those results are then stored in the first user knowledgebase as the most recent human trait first user in possession probability. A separate learn by experience task of the first level predictive process applies knowledge learned to the first user knowledgebase to enhance and refine the knowledgebase to improve accuracy and to accommodate lifestyle changes.

Establishing the user in possession is the first user of the device by use of a single human trait runs the risk of false positive results, increased risk of hijacking and impersonation. Avoidance of these risks, the very same suffered by prior art, is obtained only by a second level predictive process run on a demand or periodic basis that evaluates the accumulated human trait knowledge of the present user of the device by considering multiple human trait indicators. The collective knowledge of human traits as represented by the most recent human trait first user in possession probability from the first user knowledgebase are used to produce a final possession probability factor indicating the device is or is not in the possession of the first user. This mathematical process, such as by use of neural network, is influenced by weights assigned to each type of human factor being monitored. Each human trait is assigned a positive and a negative weighting value. The positive weight influences the contribution the human trait makes to an increased probability of equality and the negative weight influences the contribution the human trait makes to a decreased probability of equality. For example, the handedness human trait makes little contribution to a positive leaning probability of equality primarily, due to there being many more right handed humans than left handed, but an extremely high contribution to negative leaning probability of equality. In the event the final probability is inconclusive then the present user of the device is required to produce proof of identity, the results of which are applied to adjust the probability to form a final conclusion of identity of the present user of the device.

In one embodiment, a personal identification system of a device is disclosed. The personal identification system includes a device comprised of a primary network transceiver having a globally unique identifier and a secondary network transceiver of the near proximity type such as personal area network, near-me area network or body area network including a unique identifier, a storage medium, a plurality of sensor circuits and the personal identifier circuits which may be implemented as hardware or software or a combination of both. During a training and learning process a first user knowledgebase of measurable human trait values of physical, physiological, environmental, biometric, emotional, and activity human traits is established and stored on the device. After establishing a first user knowledgebase, a first level predictive session is employed to, on a continuing periodic basis, monitor each of the plurality of human traits to establish a probability of equality between the newly acquired trait values representing the present user of the device and those from the first user knowledgebase. The resulting probability is then stored in the knowledgebase for the trait being monitored. On a periodic or demand basis a second level predictive session establishes a probability the device is in the possession of the first user by evaluating all first level predictive session probabilities leading to construction of the personal identifier code, an amalgamation of the probability of possession by first user with the unique SIM network identifier and the unique identifier (BD_ADDR) address of the secondary network transceiver after which the personal identifier is then available for delivery to an inquisitor.

In another embodiment, the personal identifier method operating on a mobile device such as, for example a cellphone, is disclosed. After a training and learning method to establish a first user knowledgebase, a first level predictive method is employed to establish a probability that individual human traits of the present user of the mobile device is representative of the first user of the mobile device. A second level predictive method is used on a periodic or demand basis to establish from the collection of all human traits the probability of the first level predictive method the present user of the device is the first user of the device. Following second level prediction is construction of the personal identifier code, an amalgamation of the probability of possession by first user with the unique SIM network identifier and the unique identifier (BD_ADDR) address of the secondary network transceiver after which the personal identifier is then available for delivery to an inquisitor.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
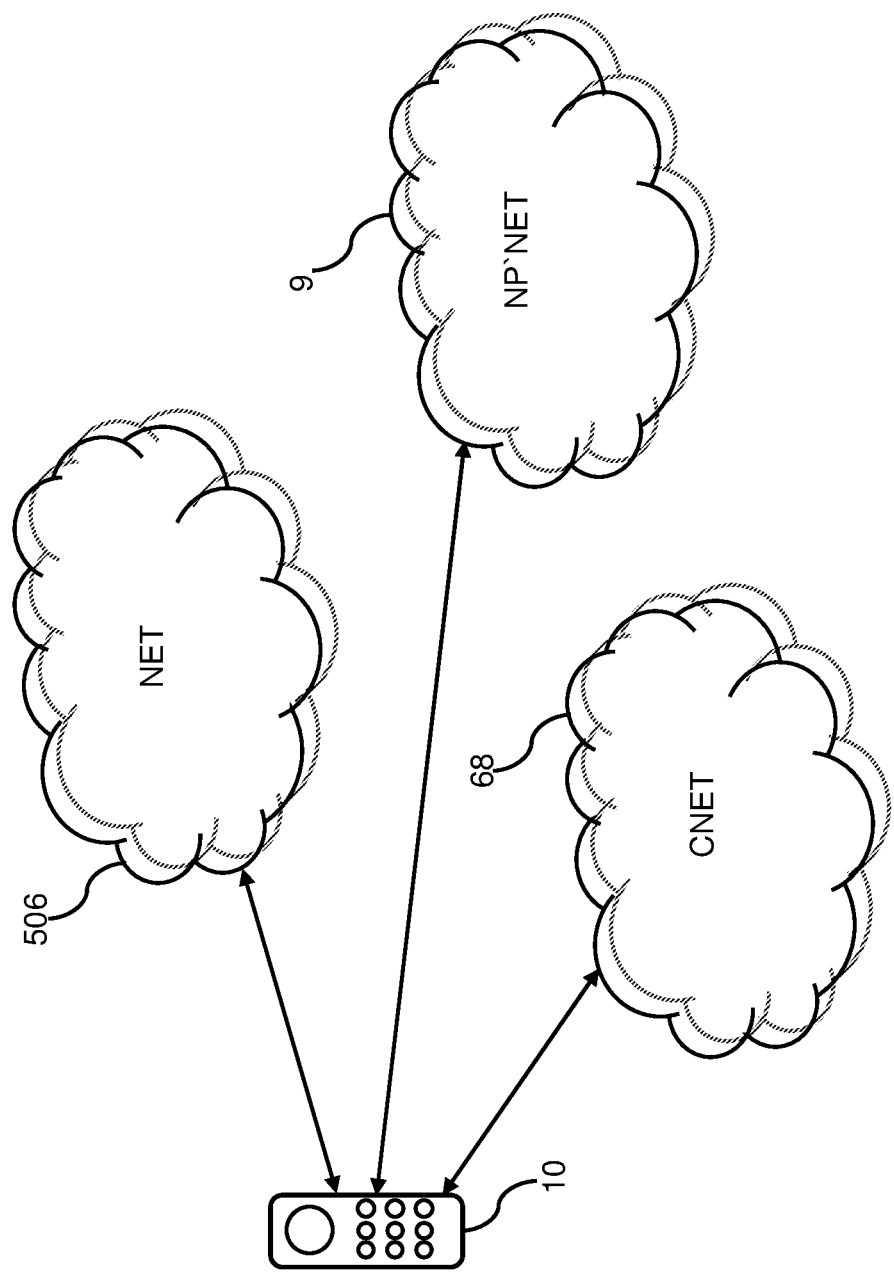
FIG. 1 illustrates a typical cell phone in various modes of communications associated with multiple networks including cellular, local, wide and near proximity area networks.

Reference will now be made in detail to the presently preferred embodiments of the invention, examples of which are illustrated in the accompanying drawings. Throughout the following detailed description, the same reference numerals refer to the same elements in all figures.

The invention relies on use of a plurality of physical, physiological, environmental, biometric, or activity traits. Throughout this description reference to the term "trait", "human trait" or "habitual trait" shall be construed as a reference to any of the following types of traits as they relate to those of the human: air temperature, air pressure, relative humidity, location (latitude, longitude and altitude), motion (direction, speed and mode), cellular device (towers), device orientation, time (millisecond, time of day, day of week, day of year), scene, waking hour, retiring hour, touch (tap, swipe, number of fingers, finger size, pressure, duration, direction, speed), voice signature, handedness, favored ear, gender, age group, heart rate, glucose level, blood pressure, blood o2 level, emotions, hair color, skin color, iris scan, eye size, eye spacing, texting patterns, calling patterns, email patterns, internet usage, social media patterns, social media usage, significant motion, stationary, human position, mobility step, mobility pace, mobility stride, mobility speed, mobility distance, mobility mode, finger print, palm print and retinal scan.

Measurable values of human traits as recognized by the invention are produced by use of electrical circuits referred to throughout this description as "sensor" or "sensory". Production of measurable values of human traits is dependent on inputs from one or more of the following types of sensor circuits: accelerometer 8, ambient temperature sensor 16, gyroscope 11, heart rate sensor 18, blood pressure, glycosometer, oximeter, weight scale, ambient light sensor 14, IR (infrared light), magnetometer 12, atmospheric pressure sensor 15, proximity sensor 13, relative humidity, device temperature, touch screen, camera front, camera back, microphone 95, cell tower, GNSS (GPS, GLONASS, Galileo), UV (ultraviolet light), GFR (galvanic skin response), human temperature, respiration, hydration, motion (three degrees of freedom or six degrees of freedom) and DNA.

Throughout this description the term "possession" means "in possession of" as a state of having on one's person.

Throughout this description, a cell phone is used as an example of a device, though any electronic device, typically a processor-based device, is anticipated such as a mobile device having a minimal hardware composition of a primary network transceiver inclusive of a subscriber identity module (SIM) with unique network identifier, a secondary transceiver of the personal area network type such as Bluetooth having a unique identifier (BD_ADDR) address, a storage medium and a human user interface. The device would also incorporate one or more sensor circuits all of which provide inputs that are used by the disclosed software system and methods to produce measurable values representing a plurality of human traits that uniquely identify the first user of the device and are used to determine if the present user of the device is the first user of the device.

Throughout this description, the term, "first user" is used to describe the person who owns or is assigned the device. Multiple incarnations of the present invention on the same mobile device can be used to accommodate situations where a mobile device has more than one assignee.

The personal identification system 102 (see FIGS. 3,4 and 4A) determines a probability that the person in possession of a mobile device (e.g. a cell phone) is a person that is known to the device (e.g. the "first user"). Such determination is based upon foreknowledge acquired by the personal identification software system, the human traits as they relate to the first user. Such traits, preferences, habits, etc. are represented in the form of data, for example, as is acquired from a neural network training session. This trait data (neural network neuron biases, values and weights) is captured and saved in a first user's knowledgebase thus creating a trait profile during a machine learning session, resulting in a timeline of trait event data stored over a period of time, for example, over several days of use.

The probability that the device is in the possession of the first user is derived through first and second level predictive processes. During these predictive process, in some embodiments, refinements are made to a first user's trait profile within the knowledgebase so as to improve the accuracy of the first user's trait profile by elongation and by refinements to comparator seeds, thus capturing lifestyle changes. For example, neuron weight and bias settings are updated in the case where neural networks are employed for memorization and comparing.

In some embodiments, proof of identity logic is triggered during first level predictive process when the resulting probability indicates ambiguity. For example, if the user in possession of the device cannot be affirmed with high probability, a request is presented to the user in possession to provide proof of identity, possibly from a plurality of proof types, receipt of which is compared to stored responses resulting in a determination the user in possession of the device is the first user, or is not the first user as identified by the first user trait profile knowledgebase.

In some embodiments, a reporting task is provided by which the output, a personal identity code, is made available to inquisitors.

Therefore, one embodiment will indicate to an inquisitor the possession status of the device as being in the possession of the person identified in the first user knowledge base or in the possession of someone other than the person identified in the first user knowledgebase. The inquisitor receiving a personal identity code indicating the person in possession is the first user and by knowing the person the device is assigned to is the queried device is assured the person is who they claim to be without risk of the person in possession being any other person in the world.

In FIG. 1, an exemplary data connection diagram of the personal identification system 102 is shown. The personal identification system 102, for example, operates on an end user device (e.g. cell phone 10) to monitor usage and determine if the device (e.g. cell phone 10) is in the possession of the first user.

In the example shown, the cell phone 10 is in communications with the cellular network 68 and Internet 506 by WiFi transceiver and in communications with another network 9, for example, Bluetooth or other RF technologies. An inquisitor seeking to confirm the identity of the person in possession of the device may employ use of either or all networks to retrieve the current personal identity code. In addition, use of any network can be for purpose of accessing sensory devices employed in the capture and development of measurable values indicative human traits.

Figure 2:
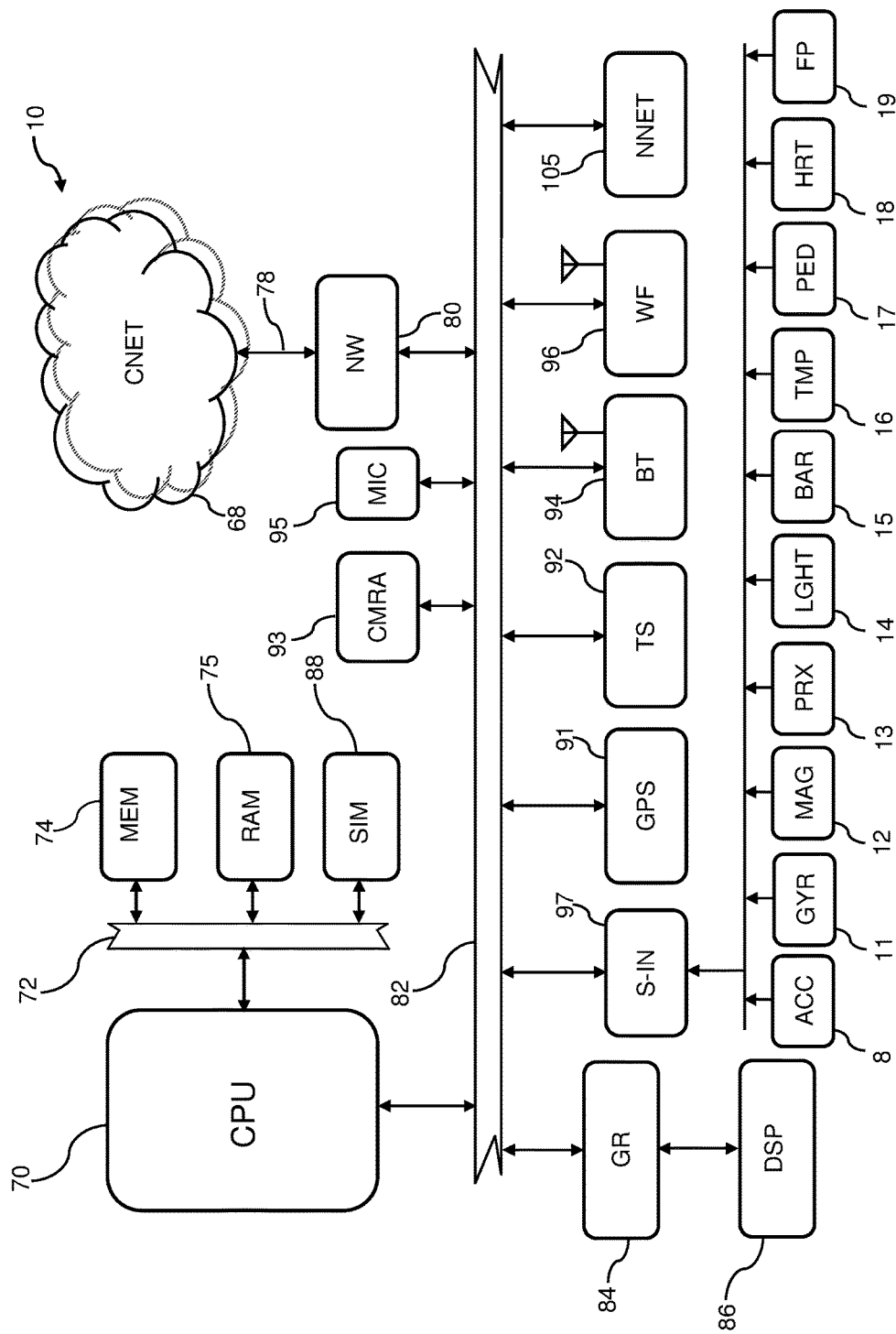
FIG. 2 illustrates an exemplary cell phone.

Referring to FIG. 2, a schematic view of a typical device, a cell phone 10, is shown. Although any device(s) is/are anticipated, for clarity purposes, a cell phone 10 will be used in the remainder of the description.

The personal identification system 102 is described operating within and, possibly protecting a processor-based device (e.g., cell phone 10) providing for determination if the device (cell phone 10) is in the possession of the first user of the device. Again, although a cell phone 10 is used in the description, the present invention is in no way limited to using a cell phone 10 as any computational device (typically processor-based, but not required to have a processor) is anticipated (e.g., a mobile device having minimal facilities as afore describe, etc.).

The example cell phone 10 represents a typical device one which the personal identification system 102 operates. This exemplary cell phone 10 is shown in its simplest form. Different architectures are known that accomplish similar results in a similar fashion and the present invention is not limited in any way to any particular cell phone 10 system architecture or implementation. In this exemplary cell phone 10, a processor 70 executes or runs programs loaded in a random-access memory 75. The programs are generally stored in persistent memory 74 and loaded into the random-access memory 75 when needed. Also, accessible by the processor 70 is a SIM (subscriber information module) card 88 having subscriber identification encoded there within and often a small amount of persistent storage. The processor 70 is any processor, typically a processor designed for cell phones 10. The persistent memory 74, random-access memory 75, and SIM card are connected to the processor by, for example, a memory bus 72. The random-access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, flash memory, read only memory, battery-backed memory, etc. In some exemplary cell phones 10, the persistent memory 74 is removable, in the form of a memory card of appropriate format such as SD (secure digital) cards, micro SD cards, compact flash, etc.

Also connected to the processor 70 is a system bus 82 for connecting to peripheral subsystems such as a cellular network interface 80, a graphics adapter 84 and a touch screen interface 92. The graphics adapter 84 receives commands from the processor 70 and controls what is depicted on the display 86. The touch screen interface 92 provides navigation and selection features.

In general, some portion of the persistent memory 74 and/or the SIM card 88 is used to store programs, executable code, and data, etc. In some embodiments, other data is stored in the persistent memory 74 such as audio files, video files, text messages, etc.

The peripherals are examples and other devices are known in the industry such as Global Positioning Subsystem 91, speakers, USB interfaces, cameras 93 (front and back facing), microphone 95, Bluetooth transceiver 94 having a unique Bluetooth network address (BD_ADDR), Wi-Fi transceiver 96, accelerometers 8, gyroscopes 11, magnetic sensors 12 (e.g. for directional sensing), proximity sensors 13, ambient light sensors 14, barometric pressure sensors 15, ambient temperature sensors 16, pedometers 17, heart rate sensors 18, finger print readers/sensors 19, etc. and including any sensor capable of producing a value indicative of a physical, physiological, environmental, biometric, emotional, or activity, the details of which are not shown for brevity and clarity reasons.

The cellular network interface 80 connects the cell phone 10 to the cellular network 68 through any cellular band and cellular protocol such as GSM, TDMA, LTE, etc., through a wireless medium 78. There is no limitation on the type of cellular connection used. The cellular network interface 80 provides voice call, data, messaging services as well as Internet access to the cell phone 10 through the cellular network 68.

For local communications, many cell phones 10 include a Bluetooth transceiver 94, a Wi-Fi transceiver 96, or both and some cell phones support other network schemes as well, such as including near-me and body area networks. Such features of cell phones 10 provide data communications between the cell phones 10 and data access points and/or other computers such as a personal computer (not shown) as well as access to other types of sensors that may be employed as part of the first user identification process.

The personal identification system 102 is anticipated to be implemented in hardware, software or any combination thereof.

The personal identification system 102 detects and learns human traits of the device's owner or assignee (herein, first user) employing any combination of inputs and sensory devices such as for example 10/11/12/13/14/15/16/17/18/19/20/93/95, including, but not limited to, accelerometers 8, gyroscopes 11, magnetometers 12, proximity sensors 13, light sensors 14, barometers 15, ambient temperature sensors 16, pedometers 17, heart rate sensor 18, fingerprint sensors 19, cameras 93, microphones 95, Global Positioning System (GPS/GNSS) receivers 91, etc. Further inputs to the personal identification system 102 include detection of cell tower related information, detection and strength of other devices within range, and user-interface inputs. During the monitoring process, the personal identification system 102 receives inputs and calculates a probability of the device being in the possession of the first user and not being in the possession by someone other than the first user.

The inputs and sensors listed above (inputs and sensory devices 8/11/12/13/14/15/16/17/18/19/20/93/95) are examples as the present invention is anticipated to work with any possible input or sensory device to measure and detect how and where the rightful owner uses the device, including inputs and sensors that are not currently available on certain devices but become available in the future.

One example of using a sensory device is using a camera 93. As the user holds the device and looks at the display, the user is also looking into the camera 93 (front facing) of the device 10. Being such, the personal identification system 102 has access to the camera and the ability to periodically capture an image of the current user and, using for example facial recognition or iris recognition, the personal identification system 102 records data regarding the current user, then when personal identification system 102 is called upon to determine the probability that the current user is the rightful owner, this recoded data feeds into the resulting probability with a certain weight, likely a high weight. So, in very high-level terms, if the rightful owner has eyes that are blue and relatively close to each other and the current user has eyes that are brown and somewhat distant from each other, the image captured from the camera 93 will be a factor in generating a low probability that the device is in possession of the rightful owner.

In some embodiments, the personal identification system 102 is implemented entirely in software. In these embodiments, the personal identification system 102 is loaded into RAM 75 and executed by the processor 70, monitoring sensory input devices 8/11/12/13/14/15/16/17/18/19/20/93/95, Global Positioning System (GPS/GNSS) receivers 91, Wi-Fi transceivers 96, cellular network transceivers 80, Bluetooth transceivers 94 and input devices (e.g. touch screen interface 92), reading and storing data in the persistent memory 74. The personal identification system 102 learns information about the first user by gathering learned data from a plurality of sensory inputs used to produce measurable values representing human traits for a period of time or until sufficient data is obtained to later determine if the cell phone 10 is in the possession of the first user. The learned data is stored as a first user knowledgebase, for example, in the memory 74 and later used by the personal identification system 102 to calculate a probability that the cell phone 10 is in the possession of the first user. An example of such traits is which hand the user holds the device 10, a sequence of usage of applications run on the device 10, keying speed, keying accuracy, typical keying errors, etc.

In some embodiments, the personal identification system 102 is implemented partially in software and partially in hardware using a hardware accelerator 105 such as a hardware-implemented neural network. In these embodiments, the software portion of personal identification system 102 is loaded into RAM 75 and executed by the processor 70, monitoring sensory input devices 8/11/12/13/14/15/16/17/18/19/20/93/95, Global Positioning System (GPS/GNSS) receivers 91, Wi-Fi transceivers 96, cellular network transceivers 80, Bluetooth transceivers 94 and input devices (e.g. touch screen interface 92), reading and storing data in the persistent memory 74. The personal identification system 102 learns information about the first user by gathering learned data from a plurality of human traits for a period of time or until sufficient data is obtained to later determine if the cell phone 10 is in the possession of the first user. The learned data is stored as a first user knowledgebase, for example, in the memory 74 and later presented to the hardware accelerator 105 by the personal identification system 102 software to calculate a probability that the cell phone 10 is in the possession of the rightful owner.

As anything that is implemented in software is capable of being implemented in hardware/logic, in some embodiments, the personal identification system 102 is implemented entirely in hardware using an accelerator 105 having a controller such as a hardware-implemented neural network with processing. In these embodiments, the accelerator 105 with processing monitors sensory input devices 8/11/12/13/14/15/16/17/18/19/20/93/95, Global Positioning System (GPS/GNSS) receivers 91, Wi-Fi transceivers 96, cellular network transceivers 80, Bluetooth transceivers 94 and input devices (e.g. touch screen interface 92), reading and storing data in the persistent memory 74 or in memory local to the accelerator 105 with processing. The personal identification system 102 learns information about the first user by gathering learned data from a plurality of human traits for a period of time or until sufficient data is obtained to later determine if the cell phone 10 is in the possession of the first user. The learned data is stored in a first user knowledgebase, for example, in memory local to the accelerator 105 or in the cell phone 10 memory 74 and later read by the hardware accelerator 105 with processing to calculate a probability that the cell phone 10 is in the possession of the rightful owner.

At the core of the present invention exists a first mathematical function that can be trained using a first set of inputs such that parameters of the first mathematical function when applied to a second mathematical function enable the second mathematical function to process a second set of inputs producing a value indicative of probability of likeness of the second set of inputs to the first set of inputs. One such mathematical function suitable for this purpose is that of the Neural Network taken from the science of Artificial Intelligence.

Figure 5:
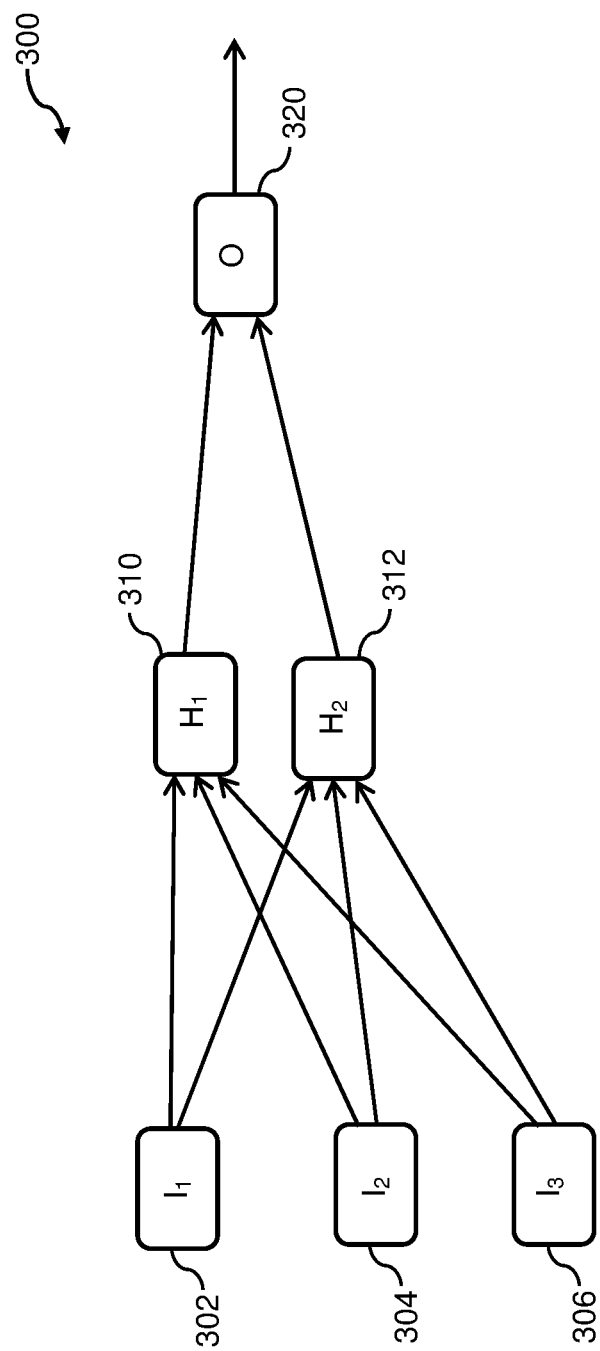
FIG. 5 illustrates a three input feed forward neural network having two hidden neurons.

Referring to FIG. 5, an exemplary implementation of the personal identification system 102 within which a mathematical process 300 represented by a simplified multilayer feed forward neural network is depicted. During a learning process, iterative sampling of sensory input devices 8/11/12/13/14/15/16/17/18/19/20/93/95, Global Positioning System (GPS/GNSS) receivers 91, Wi-Fi transceivers 96, cellular network transceivers 80, Bluetooth transceivers 94 and input devices (e.g. touch screen interface 92), etc., are processed by the neural network in training mode over a period of sufficient duration to, in effect, learn the sensory input values. For each iteration, input values are fed into 302, 304 and 306 neurons with adjustments being made to weights and biases of hidden neurons 310 and 312 based on deviations between output value of neuron 320 and desired sample output. The iterative process is repeated using newly captured sensory inputs with continued refinements by use of error function feedbacks being applied to hidden neuron weights and biases. After the multi-iteration cycle the accumulated hidden neuron weights and biases are saved to a knowledgebase as a dataset aligned to time such that the collection of saved datasets represents a timeline of sensory sampling events. During a subsequent predictive process newly acquired sensory inputs are fed into input neurons 302, 304 and 306 of a neural network that was provisioned with a dataset of weights and biases taken from the knowledgebase timeline relative to the same time period with the resulting output from neuron 320 representing a value between 0 and 1 that represents the probability the newly acquired sensory inputs are like or similar to the original set of sensory inputs employed to learn and create the knowledge dataset.

Figure 3:
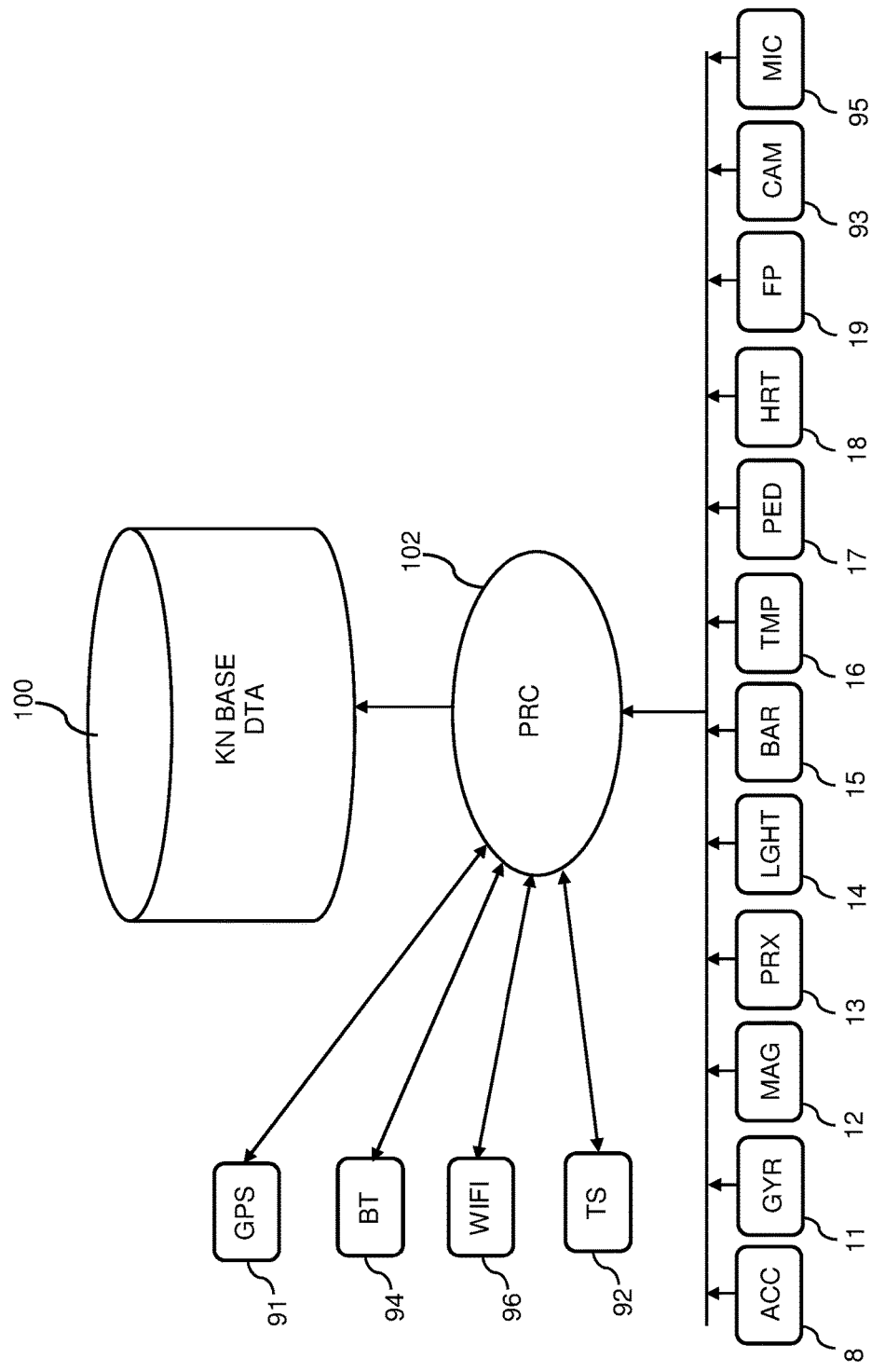
FIG. 3 illustrates a learning mode of the personal identification system.

Referring to FIG. 3, a schematic diagram of the personal identification system 102 operating in the training and learning mode is shown. The personal identification system 102 monitors one or more sensory input devices 8/11/12/13/14/15/16/17/18/19/20/93/95, Global Positioning System (GPS/GNSS) receivers 91, Wi-Fi transceivers 96, cellular network transceivers 80, Bluetooth transceivers 94 and input devices (e.g. touch screen interface 92), etc., gathering data during the training and learning mode and storing the data in a knowledgebase 100 (e.g., the knowledgebase is stored in the persistent memory 74). The training and learning mode is anticipated to be executed as an iterative process for a period of time (e.g. two weeks, 10 days), or the training and learning mode is anticipated to gather data into the knowledgebase 100 until the personal identification system 102 has sufficient data as to reliably determine if it is in the possession of the first user.

Each embodiment of the invention implements support of a plurality of human traits suitable to meet the requirements of reliable and accurate first user identification. The training and learning mode is carried out independently for each human trait such that there is a separate first user event timeline dataset for each human trait within a common knowledgebase. Each event dataset is aligned to a period in time, such as for example the period of 8:00 through 8:04 the morning of the third day of the week and includes data representative of sensory inputs learned during that period. Additional dataset periods are assembled as a timeline of dataset events such that, for example for a given day of the week there would be a dataset for the period of 8:00 through 8:04 and another dataset for the period of 8:05 through 8:09 and so on.

As explained, each learned event dataset contains information related to a first mathematical process in a form and format suitable to provisioning a second mathematical process like that of the one used to create the data of the dataset. However, newly acquired sensory values input to the second mathematical process produce a second value output indicative of likeness of the second value to the value employed to create the dataset. In other words, a probability of likeness.

Figure 6:
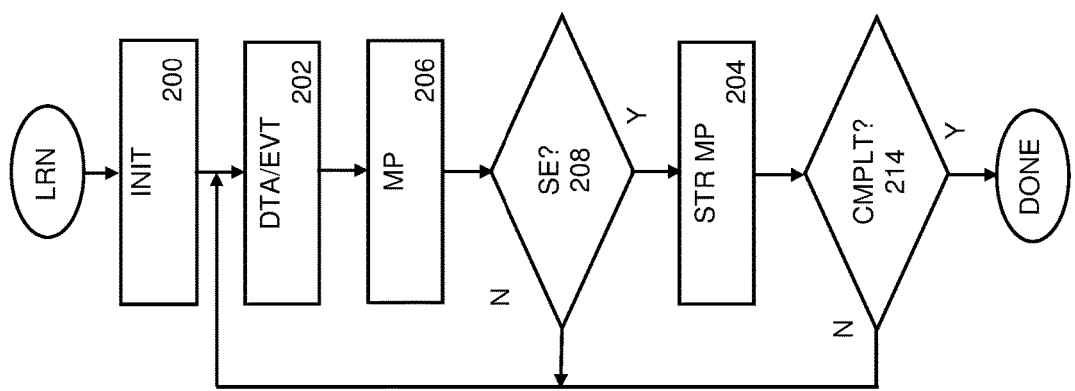
FIG. 6 illustrates an exemplary program flow during learning mode of the personal identification system.

Referring to FIG. 6, an exemplary program flow indicative of training and learning mode of the personal identification system 102 is shown. The training and learning mode begins with an initialization step 200 which, among other things, initializes the knowledgebase 100. In some embodiments, this initialization process may include collection of first user credentials such as password, PIN, secret phrase or a biometric such as finger print, palm print, voice or sound signature snippet, retinal scan or other such secret identifiers known only to or produced by the first user. The number and type of human traits to be employed is provisioned to the knowledgebase with each including the human trait type, initial probability of possession by first user of 0.999, a probability of possession factor depletion value and both the positive and negative probability of possession weighting factors. A training and learning mode process is then initiated for each of the embodiments human traits with the remainder of the training and learning mode being identical for each of the human traits of the embodiment.

For each human trait, the training and learning mode continues in an iterative loop wherein each iteration is initiated by sensory input event or timer at 202 followed by capturing inputs from one or more sensory devices 8/11/12/13/14/15/16/17/18/19/20/93/95, Global Positioning System (GPS/GNSS) receivers 91, Wi-Fi transceivers 96, cellular network transceivers 80, Bluetooth transceivers 94 and input devices (e.g. touch screen interface 92), etc. As new sensory data are captured 202, the sensory data are processed 206 by use of mathematical process 300 after which stint ending event 208 is evaluated and if false, returns to wait for the next sensory event 202. The duration of stint is a function of the type of human trait being learned. On the stint conclusion store 204 mathematical process artifacts to knowledgebase 100 and then evaluate if the training and learning period has completed 214.

Completion test 214 is performed to determine if the learning mode is complete. The completion test 214 is, for example, a passing of an interval of time (e.g. 15 days), gathering of sufficient knowledge data in knowledgebase 100, a passing of a sufficient number of usage time (e.g. the device 10 was used for 40 hours), a test to see if the personal identification system 102 is able to determine if the user of the device 10 is the first user, etc. If the completion test 214 determines that the learning mode is complete, the learning mode ends, otherwise the loop continues with awaiting for the next sensory or timeout event 202.

Figure 4:
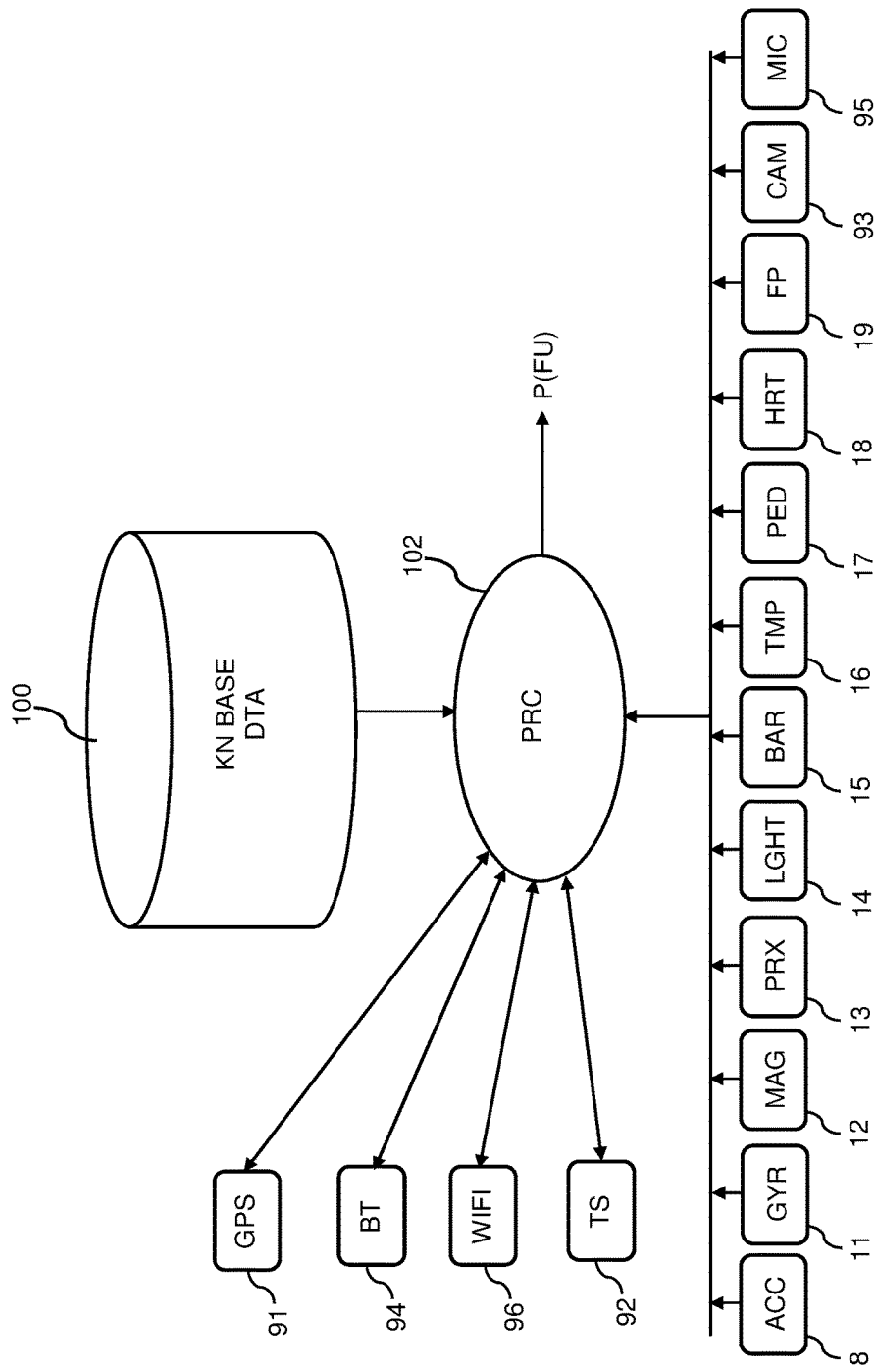
FIG. 4 illustrates a usage mode of the personal identification system in first level predictive mode (P(RO) to P(FU)).

Referring to FIG. 4, the first level prediction mode will be described. The first level prediction mode is performed iteratively and as an independent task for each human trait of the embodiment. The first level prediction mode calculates a probability factor of a single human trait indicating the likelihood that human trait of the present user of the device is equal or nearly so to the same human trait of the first user of the device for the same relative time period. As such, there is a first level prediction mode process running periodically on behalf of each human trait of the embodiment. The periodic rate is determined by timer or sensory event signal, depending on the type of human trait and sensors being monitored. In the first level prediction mode, data from a plurality of sensory input devices 8/11/12/13/14/15/16/17/18/19/20/93/95, Global Positioning System (GPS/GNSS) receivers 91, Wi-Fi transceivers 96, cellular network transceivers 80, external sensors connected through, for example, Bluetooth transceivers 94, and input devices (e.g. touch screen interface 92) are captured by the personal identification system 102. One of the sensory values is time of day and day of week.

The personal identification system 102 compares this data to previous stored data in the first user knowledgebase 100. Comparison is accomplished by provisioning a mathematical process 300 from first user knowledgebase 100 with human trait event data for the relative time period of this first level predictive event and then inputting to provisioned mathematical process 300 the sensory data just captured thus producing as an output 320 a probability factor indicating the likelihood the newly acquired present user human trait value equals that of the first user P(FU). The resulting P(FU) value is stored to first user knowledgebase 100 associated with the human trait.

By way of example of the first level predictive process, consider a first level predictive process of an IRIS scan human trait of a present user of the device having brown eyes as compared to the same human trait taken from first user knowledgebase 100. If the first user has blue eyes then the resulting P(FU) value would be quite low indicating inequality while if the first user eye color is hazel then the P(FU) value may be somewhat higher, perhaps so much so as to be considered inconclusive, and if the first user eye color is brown then the P(FU) value would be very high indicating equality.

To address the possibility of an inconclusive P(FU) value the embodiment implements a spontaneous demand for proof of identity from the present user of the device. While the type of proof is a function of the embodiment implementation, it may include such proofs as password, PIN, secret phrase or a biometric such as finger print, palm print, voice or sound signature snippet, retinal scan or other such secret identifiers known only to or produced by the first user. Comparison of the provided proof would be with like type of proof master from the first user knowledgebase 100 with the results used to push the probability value P(FU) to either one extreme or the other.

In the event that proof of identity establishes the present user is the first user then in this case a learn by experience mode is employed that is like the training and learning mode but limited to updating the current knowledgebase 100 entry for this human trait event, aligned to time, refining the knowledgebase 100 entry to become more accurate and/or to accommodate for temporary or permanent first user lifestyle change.

Figure 7A:
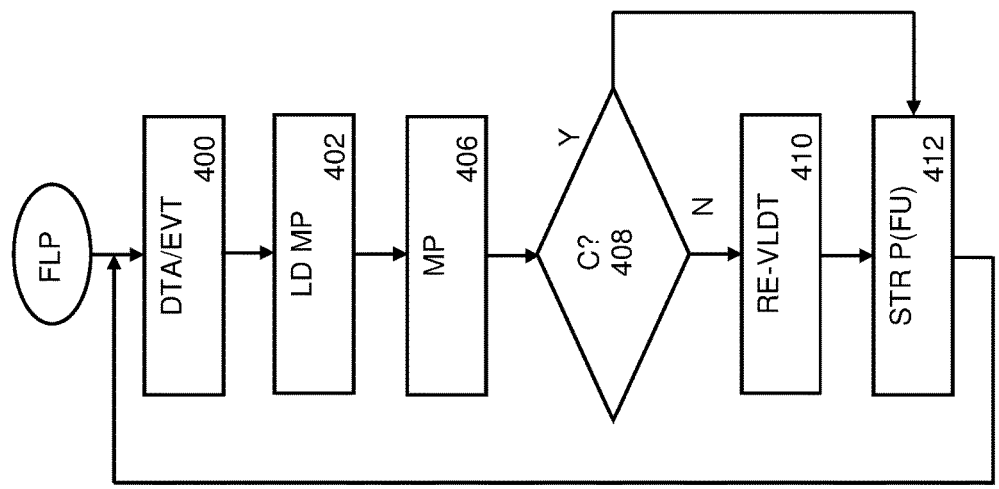
FIG. 7A Illustrates an exemplary program flow during first level predictive process of the personal identification system.

Referring now to FIG. 7A flow chart, an exemplary first level prediction mode is described. First level predictors are looping functions that have no ending. Their purpose is to periodically produce a probability value P(FU) indicative of the present user of the device being the first user of the device, storing the findings to knowledgebase 100. The prediction process begins on time out of a timer or on receipt of a sensory event signal at which point sensory data is collected 400 from a plurality of sensors, one of which is time. Based on the time, including day of week, a mathematical process is provisioned 402 with mathematical process artifacts taken from first user knowledgebase 100 for the human trait being monitored by this first level predictive process. The collected sensory input data is then input to the provisioned mathematical process 406 resulting in a P(FU) value that indicates a conclusive or inconclusive result. If inconclusive 408 then the present user of the device is required to provide proof of identity 410 in the form of, for example password, PIN, secret phrase or a biometric such as finger print, palm print, voice or sound signature snippet, retinal scan or other such secret identifiers known only to or produced by the first user and upon validation of the proof provided by comparison to like type of proof master from the first user knowledgebase 100 and thereby updating the probability P(FU) value to a conclusive state. The final probability of possession by first user factor P(FU) is stored 412 in first user knowledgebase 100 after which the first level predictive process returns to await the next periodic event 400.

Figure 4A:
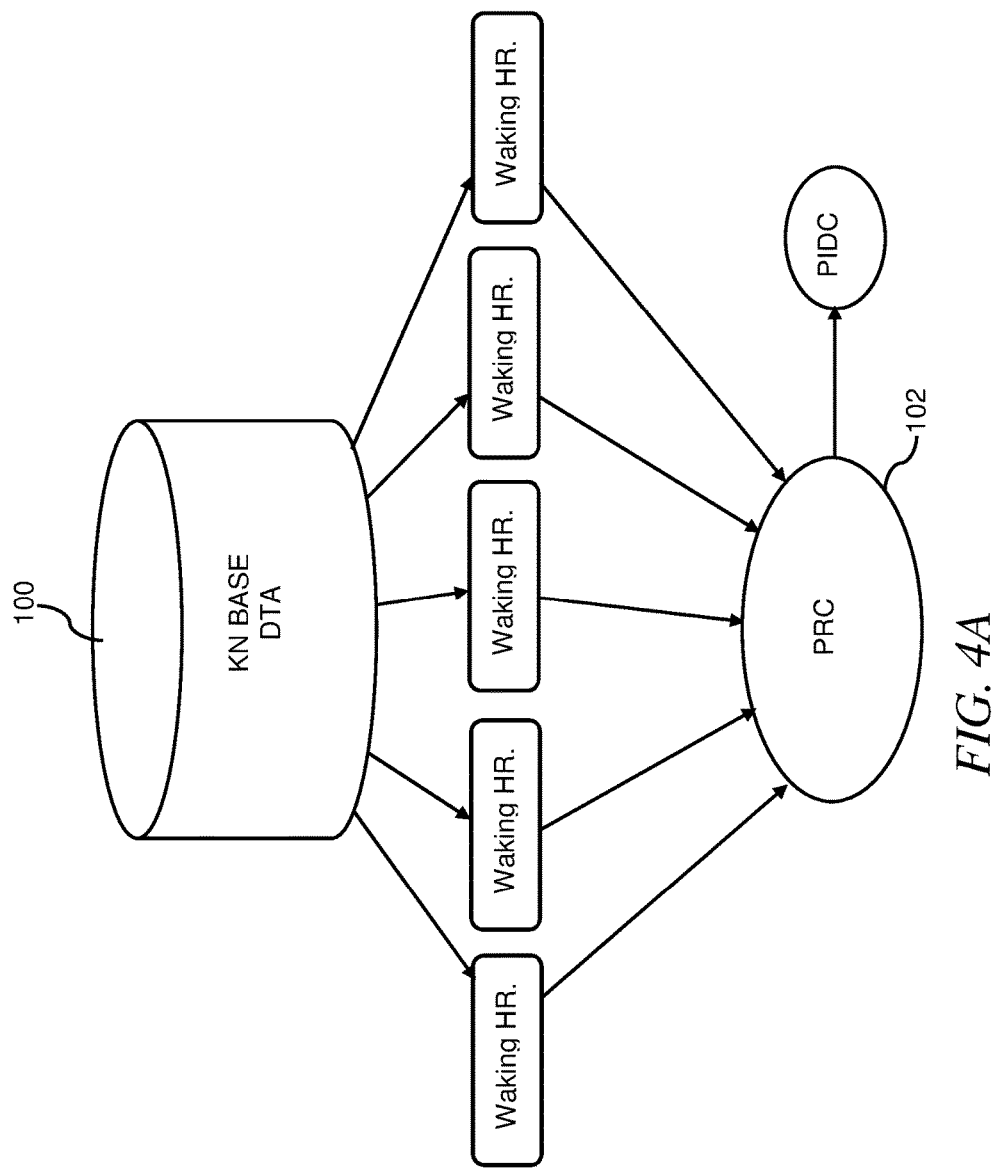
FIG. 4A Illustrates a usage mode of the personal identification system in second level predictive mode.

Referring to FIG. 4A, the second level prediction mode is described. The second level prediction mode produce and deliver a personal identification code output to an inquisitor who is seeking to learn if the present user of the device is in fact the first user of the device. This determination is arrived at by this second level predictive process of evaluation of the probability factors P(FU) of all human traits being monitored by the embodiment and from that producing a final probability factor FP(FU) indicating the likelihood the person in possession of the device is or is not the first user of the device.

While human trait probability of possession by first user P(FU) are reliable indicators contributing to determination of identity, they cannot serve to do so singularly nor do all human trait probability apply equally to both positive and negative determination and the contribution made diminishes with time and there is always the possibility that a human trait cannot be determined at all. These possibilities are addressed by weights, deviation and diminishment values that are applied to mathematical process calculations.

There are 2 weights applicable to the contribution made by a human trait probability factor P(FU) to calculation of the final probability factor FP(FU), the positive weight and the negative weight. The positive weight indicates the influence the human trait factor makes to calculation of the final factor when the probability of the human trait is positive and negative weight is applied in the case of human trait factor being negative. As an example, consider handedness. If the first user is right handed and if the present user is right handed, as are approximately 75% of humans, then the positive weight would be quite low, perhaps in the 25% or lower neighborhood. However, if the present user is left handed then the negative weight would be set quite high, perhaps to 99%. Weights are unique to each human trait and may, in some embodiments, not be used at all.

The deviation trait simply means, deviation from the expected. For example, if the location human trait is expected to have a first level predictive iterative cycle of once per hour and if it's been 3 hours since the last renewal then there is a deviation of 2 hours that must be factored negatively into the calculations to establish probability of possession of owner. Deviation is unique to each human trait and may, in some embodiments, not be factored at all. The possibility of deviation arises on those human traits dependent on sensor event to initiate human trait capture and calculation. In the example provide here, if capture of the location trait were the result of accelerometer event and if there is no accelerometer event then it is likely a deviation would exist.

Diminishment is applicable to human trait probability of possession factors as those factor values age. For example, location may be on a 1 hour first level predictive cycle and when first captured each hour, contributes 100% of its value, after adjusted for weights, to calculation of the final probability of possession FP(FU) factor. However, as time ticks away toward the next iterative cycle, the contribution location makes to the final probability calculation must be diminished to account for the ageing. Diminishment value is unique to each human trait and may, in some embodiments, not be used at all.

In the first level predictive mode the probability factor P(FU) for each human trait being monitored by the embodiment are computed and stored in first user knowledgebase 100. Those probability factors P(FU) serve as input to the personal identification system 102 in second level predictive mode being fed into a mathematical process, also provisioned from first user knowledgebase 100. The output of the mathematical process is a final probability of possession by first user FP(FU) factor that is then combined with unique device identifiers, such as SIM card IMSI and Bluetooth BD_ADDR identifiers, to produce the personal identifier code. The personal identification code is, when requested, provided to an inquisitor seeking to know if the device is in the possession of the first user of the device. For example, the inquisitor may be a remote computer seeking identification by text message to the device known to belong to the first user of the device. In another example, the inquisitor may be an access control device to a building, car, plane, boat or ATM machine or perhaps even an access gate replacing the TSA credentials inspector, that seeks proof of identity by query using Bluetooth to the device known to belong to the first user. In yet another example, the query may be by bar code scanner at a retail checkout counter wherein the personal identifier code is presented on the display of the personal identity device and it, the bar code, is then read by the bar code scanner. Another example might be a data security inquisitor App running on the personal identity device that upon learning the device is not in the possession of the first user, takes defensive steps to protect user data by erasing or encrypting it to prevent the data falling into unwanted hands.

Figure 7B:
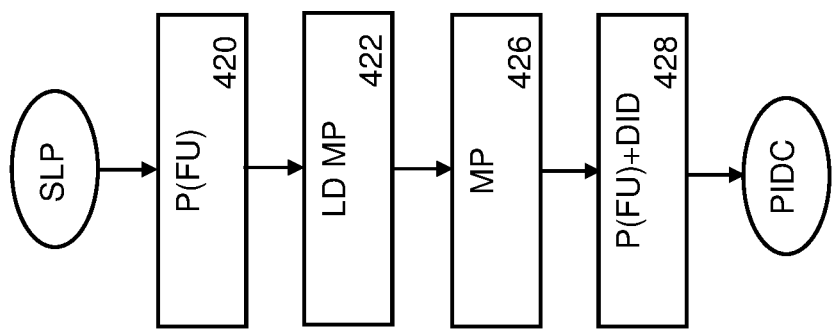
FIG. 7B Illustrates an exemplary program flow during the second level predictive process of the personal identification system.

Referring now to FIG. 7B flow chart, an exemplary second level prediction mode is described. The second level prediction mode is initiated upon receipt of an inquisitor request for production of the current personal identification code. The current personal identification code is an amalgamation of a final probability of possession by first user factor FP(FU) with device identification that in an exemplary embodiment would be the subscriber identity module (SIM) identifiers plus another unique identifier such as the Bluetooth BD_ADDR. Thus from this single code the inquisitor is assured the unique personal identifier device assigned or belonging to the first user of the device is or is not in the possession of the first user of the device. Production of the personal identifier code begins with retrieving from knowledgebase 100 the probability of possession by first user P(FU) 420 for each human trait of the embodiment followed by provisioning a mathematical process 422 with data likewise retrieved from knowledgebase 100. The collection of human trait probability factors P(FU) are then input to the mathematical process 426 thereby producing a final probability of possession of first user factor FP(FU) that is then amalgamated with device identifiers to form the personal identification code PIDC and deliver it to the inquisitor.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A traits-based personal identification system comprising:
   a mobile device having a processor, the mobile device having at least two uniquely different device identifiers and the mobile device having at least two sensors suitable for providing sensory inputs in real-time, each of the at least two uniquely different device identifiers and the at least two sensors either directly interfaced to the processor or indirectly interfaced to the processor or accessible through a transceiver of the mobile device;
   a knowledge base in a storage, the storage interfaced to the processor, the knowledge base for storage of mathematical process output artifacts;
   software running on the processor obtains and stores the mathematical artifact outputs over a period of one or more days, the software derives the mathematical artifacts from iterative learning events indicative of the device and human traits of a first user of the mobile device;
   software running on the processor perpetually produces a plurality of measurable learning event artifact values, each resulting from an iterative computational process, each representing the device traits and human traits of the first user of the mobile device using inputs captured and processed in real-time from the at least two sensors over a learning period, said plurality of measurable learning event artifact values being stored in the knowledge base;
   the software running on the processor, perpetually producing and storing for each of the device traits or human traits, an intermediate predictive probability of the mobile device being in possession of the first user of the mobile device derived by using inputs captured and processed in real-time from the at least two sensors, each input representing a device trait or human trait of a current user in possession of the mobile device, the software executes a mathematical process provisioned with the learning event artifacts from a group of one or more of the mathematical artifacts derived from prior learning events retrieved from the knowledge base;
   the software verifies a secret identifier input by the current user of said mobile device in response to a request for production of said secret identifier input;
   production of a composite probability, by computational process of the said one or more intermediate probabilities, said composite probability indicative of the current user of the mobile device being the first user; and
   production of a personal identifier code as an amalgamation of said composite probability with at least two unique device identifiers.

2. The traits-based personal identification system of claim 1, wherein a first unique identifier of the at least two unique device identifiers comprise an identifier of a first cellular network radio transceiver of the mobile device or an identifier of a security device of the mobile device; and a second unique identifier of the at least two unique device identifiers comprises an identifier of a second near proximity network radio transceiver of the mobile device.

3. The traits-based personal identification system of claim 1, wherein each of the mathematical artifacts derived from iterative learning events produced by computational process are individually identified by a relative day and a time of day of that learning event.

4. The traits-based personal identification system of claim 1, wherein the device traits and human traits representative of the current user of the mobile device includes circumstance, surrounding, location and environmental awareness traits developed from multiple sensory inputs.

5. The traits-based personal identification system of claim 4, wherein surrounding and environmental awareness traits comprise the acoustic properties of ambient sound as reflected in real-time sensory inputs of a microphone sensor.

6. The traits-based personal identification system of claim 4, wherein environmental awareness traits comprise properties of ambient light as reflected in real-time sensory inputs from a light sensor.

7. The traits-based personal identification system of claim 4, wherein environmental and locational awareness traits comprise properties of ambient electromagnetic radio waves as reflected in real-time sensory inputs from sensors including a cellular transceiver, near proximity network transceivers, an infrared light, an ultraviolet light, a microphone or a battery charger.

8. The traits-based personal identification system of claim 4, wherein circumstance awareness traits comprise properties of ambient visual perceptual space as reflected in real-time sensory inputs from camera sensors.

9. The traits-based personal identification system of claim 1, wherein one of the at least two device or human traits of the user of the mobile device developed by sensory inputs is the trait of actual device possession as a state of being in, on, or with a human.

10. The traits-based personal identification system of claim 1, wherein the device traits or human traits of the current user of the mobile device determined from real-time sensory inputs of the mobile device includes traits of a device motion; a device movement; a self-propelled motion; a vehicular motion; and a motion by conveyance.

11. The traits-based personal identification system of claim 1, wherein the learning period is at least one day.

12. The traits-based personal identification system of claim 1, wherein the learning events comprise more than one learning iterations.

13. The traits-based personal identification system of claim 1, wherein said secret identifier input by the current user of the mobile device is in response to a spontaneous request, said secret identifier input verified by use of device or human traits knowledge from prior learning events.

14. The traits-based personal identification system of claim 1, comprising a mathematical process of pattern analysis over a dataset comprising a period represented by one or more stored artifacts preceding and following the relative day and time of day of the predictive event.

15. A method of personal identification, the method comprising:
    collecting a set of traits of a first user in possession of a mobile device, the set of traits collected and processed in real-time and inclusive of at least two device traits or human traits indicative of the first user during a period of use of the mobile device by the first user of not less than seven days;

perpetually learning two or more device traits and human traits of said first user through multiple iterative learning events wherein each of the learning events comprises iterative sensor sampling performed in real-time, producing a set of mathematical artifact outputs representative of the trait during the learning event;

storing, over a learning period, each of the learning event mathematical output artifacts representative of device traits and human traits of the first user in a knowledge base that is operably interfaced to the mobile device;

perpetually monitoring device traits and human traits of a current user in possession of the mobile device by capturing in real-time the sensory inputs representative of device traits or human traits and processing those sensory inputs by a mathematical process provisioned with mathematical artifacts representative of device traits and human traits from the knowledge base for a period of time relative to the current day and time of day, thereby producing an intermediate probability that the current user in possession of the mobile device is the first user; and producing a composite probability by a mathematical process of the said one or more intermediate probabilities, said composite probability indicative of the user in possession of the device being the first user.

16. The method of claim 15, further comprising the step of producing a personal identifier code by amalgamating the composite probability with at least one unique identifier of the mobile device.

17. The method of claim 16, wherein the at least one identifier comprises an identifier of a cellular network transceiver interface of the mobile device.

18. The method of claim 16, wherein the at least one identifier further comprises an identifier of a near proximity network transceiver interface of the mobile device.

19. The method of claim 16, wherein the at least one identifier comprises an identifier of a security device of the mobile device.

20. Program instructions tangibly embodied in a non-transitory storage medium of a mobile device for providing a personal identifier, wherein the at least one instruction comprises:

computer readable instructions running on the mobile device during a learning period of at least seven full days during which the mobile device is used by a first user, the computer readable instructions using inputs from at least two sensors to learn in real-time the device traits and human traits indicative of the first user during the learning period, subdivided into multiple iterative learning events, each of the at least two sensors directly interfaced to the mobile device or remotely coupled to the mobile device through a wireless connection, and storage of each of the multiple iterative learning instances in a knowledge base;

computer readable instructions running on the mobile device perpetually monitoring in real-time the at least two sensors capturing newly acquired sensory inputs representative of two or more different device traits or different human traits of the current user of the mobile device and by mathematical process, using the multiple learning event artifacts of previously learned device traits and user traits, producing intermediate probabilities that the mobile device is in possession of the first user; and computer readable instructions running on the mobile device calculating from a set of most recent intermediate probabilities a composite probability of the current user in possession of the device being the first user.

21. The program instructions tangibly embodied in the non-transitory storage medium of claim 20, further comprising computer readable instructions running on the mobile device generating a personal identifier code by amalgamation of said composite probability of the current user in possession of the mobile device being the first user with at least two unique device identifiers.

22. The program instructions tangibly embodied in the non-transitory storage medium of claim 20, wherein the at least two unique identifiers comprise at least one of an identifier of first transceiver of the mobile device that is connected to a first cellular network and an identifier of a first security device of the mobile device.

23. The program instructions tangibly embodied in the non-transitory storage medium of claim 20, wherein the at least two unique identifiers comprise at least one of an identifier of first transceiver of the mobile device that is connected to the first cellular network and an identifier of a second transceiver of the mobile device that is connected to a near proximity network.

24. The program instructions tangibly embodied in the non-transitory storage medium of claim 20 wherein each learning event comprises production of output artifacts of a mathematical process applied to the input signals taken in real-time from one or more sensory devices.

* * * * *